(12) United States Patent
Divesh et al.

(10) Patent No.: US 11,689,420 B1
(45) Date of Patent: Jun. 27, 2023

(54) TEMPLATE BASED EDGE CLOUD CORE DEPLOYMENT

(71) Applicant: Cisco Technology, Inc., San Jose, CA (US)

(72) Inventors: Anupam Divesh, Lucknow (IN); Xuejie Zhang, Nepean (CA); Mahe Kishan Korukonda, Mountain House, CA (US); Niraj R. Londhe, Littleton, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/732,089

(22) Filed: Apr. 28, 2022

(51) Int. Cl.
*G06F 15/16* (2006.01)
*H04L 41/082* (2022.01)
(Continued)

(52) U.S. Cl.
CPC .......... *H04L 41/082* (2013.01); *H04L 41/083* (2013.01); *H04L 41/0843* (2013.01); *H04L 41/0869* (2013.01)

(58) Field of Classification Search
CPC . H04L 41/082; H04L 41/083; H04L 41/0843; H04L 41/0869
See application file for complete search history.

(56) References Cited

U.S. PATENT DOCUMENTS

| | | | |
|---|---|---|---|
| 2011/0295749 A1* | 12/2011 | Scalisi | G06Q 20/10 455/466 |
| 2015/0074639 A1* | 3/2015 | Sanghvi | H04L 41/046 717/120 |

(Continued)

FOREIGN PATENT DOCUMENTS

| | | | |
|---|---|---|---|
| CN | 102548042 A | * | 7/2012 |
| CN | 105573762 A | * | 5/2016 |

(Continued)

OTHER PUBLICATIONS

3GPP, "3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.

3GPP, "3rd Generation Partnership Project; Technical Specification Group Services and System Aspects; Study on enhancement of network slicing; Phase 2 (Release 17)", 3GPP TR 23.700-40 V17.0.0, Mar. 2021, 224 pages.

(Continued)

*Primary Examiner* — Richard G Keehn
(74) *Attorney, Agent, or Firm* — Edell, Shapiro & Finnan, LLC (57) ABSTRACT

The techniques described herein relate to methods that include: obtaining criteria for a mobile network deployment; selecting a server configuration template for a server configuration based upon the criteria; generating the server configuration for the mobile network deployment based upon the server configuration template; validating the server configuration to ensure the criteria are met by the mobile network deployment of the server configuration; deploying the server configuration as the mobile network deployment; obtaining key performance indicators from the mobile network deployment; updating the mobile network deployment in response to obtaining the key performance indicators; and updating the server configuration template in response to obtaining the key performance indicators.

20 Claims, 7 Drawing Sheets

(51) Int. Cl.
    *H04L 41/0869*     (2022.01)
    *H04L 41/084*     (2022.01)
    *H04L 41/083*     (2022.01)

(56) References Cited

U.S. PATENT DOCUMENTS

| | | | |
|---|---|---|---|
| 2015/0135087 A1* | 5/2015 | Verkasalo | H04L 67/125 |
| | | | 715/745 |
| 2017/0147364 A1* | 5/2017 | Shaposhnikov | G06F 8/35 |
| 2021/0021489 A1* | 1/2021 | Cherumbath | H04L 41/0895 |
| 2021/0144517 A1* | 5/2021 | Guim Bernat | H04L 9/0637 |
| 2021/0352534 A1* | 11/2021 | Tiwari | H04W 28/24 |

FOREIGN PATENT DOCUMENTS

| | | | |
|---|---|---|---|
| CN | 109032614 A | * | 12/2018 |
| CN | 113242309 A | * | 8/2021 |
| CN | 114301784 A | * | 4/2022 |
| WO | WO-2022156887 A1 | * | 7/2022 |

OTHER PUBLICATIONS

Milan Stolic et al., "5G Automation Architecture", Cisco White Paper, Sep. 2020, 29 pages.

Milan Stolic et al., "Five Steps to 5G Deployment", Version No. 1.1, Cisco White Paper, May 2019, 29 pages.

\* cited by examiner

TEMPLATE BASED EDGE CLOUD CORE DEPLOYMENT

TECHNICAL FIELD

The present disclosure relates to techniques for configuring and deploying network environments.

BACKGROUND

Edge computing is a concept that enables services to be hosted close to the service consumers and provides benefits such as efficient service delivery with significant reduction in end-to-end latency and decreased load on the transport network. The benefits of edge computing will strengthen the promise of current and future Third Generation Partnership Project networks.

The deployment of edge computing involves relationships between multiple providers. Edge Computing Service Providers (ECSP) may play an important role in the construction of infrastructure used by the Mobile Network Operators (MNOs) and by Application Service Providers (ASPs)—enabling them to host their edge applications close to users.

DESCRIPTION OF EXAMPLE EMBODIMENTS

Overview

In some aspects, the techniques described herein relate to methods that include: obtaining criteria for a mobile network deployment; selecting a server configuration template for a server configuration based upon the criteria; generating the server configuration for the mobile network deployment based upon the server configuration template; validating the server configuration to ensure the criteria are met by the mobile network deployment of the server configuration; deploying the server configuration as the mobile network deployment; obtaining key performance indicators from the mobile network deployment; updating the mobile network deployment in response to obtaining the key performance indicators; and updating the server configuration template in response to obtaining the key performance indicators.

In other aspects, the techniques described herein relate to an apparatus including: one or more network interfaces; and one or more processors configured to: obtain, via the one or more network interfaces, criteria for a mobile network deployment; select a server configuration template for a server configuration based upon the criteria; generate the server configuration for the mobile network deployment based upon the server configuration template; validate the server configuration to ensure the criteria are met by the mobile network deployment of the server configuration; deploy the server configuration as the mobile network deployment; obtain, via the one or more network interfaces, key performance indicators from the mobile network deployment; update the mobile network deployment in response to obtaining the key performance indicators; and update the server configuration template in response to obtaining the key performance indicators.

In still other aspects, the techniques described herein relate to one or more tangible, non-transitory computer readable mediums encoded with instructions, wherein the instructions, when executed by one or more processors, are operable to: obtain criteria for a mobile network deployment; select a server configuration template for a server configuration based upon the criteria; generate the server configuration for the mobile network deployment based upon the server configuration template; validate the server configuration to ensure the criteria are met by the mobile network deployment of the server configuration; deploy the server configuration as the mobile network deployment; obtain key performance indicators from the mobile network deployment; update the mobile network deployment in response to obtaining the key performance indicators; and update the server configuration template in response to obtaining the key performance indicators.

EXAMPLE EMBODIMENTS

Enterprise customers are moving towards private edge cloud deployments for better speed, reliability and security. Unlike service provider cloud infrastructures, which essentially have unlimited compute and memory resources, private edge clouds may be deployed using one or a few rack unit (RU) servers. Due to the "private" nature of these edge cloud deployments, the compute and memory resources may be limited, particularly relative to service provider deployments.

Private mobile network deployments may be particularly suited to private edge cloud systems. The latest Third Generation Partnership Project (3GPP) networks, such as Fifth Generation Mobile Networks (5G mobile networks), give the flexibility to configure the network for different use cases using various network slicing techniques. Put differently, 5G network slicing techniques enable the multiplexing of virtualized and independent logical networks on the same physical network infrastructure. One potential issue for 5G network slicing involves the potential difficulty in configuring the underlying physical network infrastructure to meet specific user criteria (e.g., numbers of subscribers to be served, services to be offered, quality of service (QoS) criteria, service level agreement (SLA) criteria, etc.). Where current 5G slicing techniques assist with the logical configuration of the network to provide different service levels to different customers using the same underlying infrastructure, current 5G slicing techniques do not assist service providers in allocating compute and memory resources of the underlying network devices to meet specific user criteria. Finding network engineers with the knowledge to appropriately configure the underlying infrastructure (e.g., the knowledge to appropriately allocate compute and memory resources to specific network functions) may be difficult. Accordingly, operational costs of managing network devices may be high.

Adding further complexity to the configuration of the underlying network infrastructure is the fact that not all users will be equipped with 5G devices, and may instead be using legacy Private Long Term Evolution (LTE, also referred to herein as "4G") devices. Accordingly, hybrid 4G/5G networks may be necessary to meet the needs of all users, further adding additional levels of complexity to the configuration of network infrastructure.

The techniques disclosed herein provide for the deployment of mobile network functions for 4G and 5G radio access technologies (RATs) via small form factor servers to achieve better manageability and performance. For example, the techniques disclosed herein may determine how to deploy compute and memory resources for a predetermined use case. More specifically, the techniques disclosed herein may leverage server configuration templates to determine the compute and memory resources needed to deploy a 4G/5G core for a particular use case. In other words, server configuration templates may be used to determine the compute and memory resources needed to meet the user criteria. Accordingly, engineers may not need to compute or optimize the compute and/or memory resources needed for a particular deployment, thereby reducing operational costs.

In general, disclosed herein are methods, apparatuses and computer readable mediums configured to implement operations that allow for the deployment of edge cloud networks through the use of dynamically generated and updated server configuration templates. As described in detail below, the techniques disclosed here use server configuration templates to determine server configurations for edge cloud network deployments. Once deployed, the edge cloud networks report back Key Performance Indicators (KPIs). Based upon these KPIs, artificial intelligence (AI) and/or machine learning (ML) heuristic algorithms update the server configurations and server configuration templates to ensure that the current and future deployments meet user criteria.

The server configuration templates and the server configurations of the disclosed techniques may be beneficial in deploying 3GPP mobile networks. For example, the disclosed techniques may facilitate:

1. Hybrid Support: As will be shown below, the techniques disclosed herein may be leveraged to deploy networks that are hybrids between the latest 3GPP network technologies and legacy technologies. For example, some subscribers connecting to an enterprise network may utilize 4G devices, while other subscribers may utilize 5G devices. Deployments implemented using the techniques disclosed herein may host paralleled and co-located 4G and 5G RAT elements.
2. Template Based Configuration: The template-based server configuration techniques disclosed herein may enable a service provider to deploy a 4G/5G Hybrid network using one or a few server devices that implement the functions of both network types even when the service provider engineers have minimal understanding of 3GPP parameters. Specifically, the techniques disclosed herein may only involve a network administrator providing a few parameters for a deployment (e.g., a number of subscribers, SLAs, latency criteria, throughput criteria, etc.) and the server template/configurations can be generated automatically without further user intervention. The server configuration templates generated according to the disclosed techniques will enable selection and deployment of a private network on a low or lowest form factor that meets the customer criteria. The server configuration templates generated according to the disclosed techniques also allow for selection and deployment of a private network for specific use cases, including Enhanced Mobile Broadband (eMBB) use cases, Ultra-Reliable Low Latency Communication (URLLC) use cases, High Density use cases, and/or the like. In some instances, server configuration templates may be provided for all of the use cases defined in the 3rd Generation Partnership Project Technical Specification Group Services and System Aspects Feasibility Study on New Services and Markets Technology Enablers, as prescribed in 3GPP Technical Report (TR) 22.891.
3. Low Latency for Better Performance: The disclosed techniques may permit URLLC latency even on small form factors, such as single rack unit (1RU) and three rack unit (3RU) deployments.
4. Flexible Form Factor Deployment: The server configuration templates utilized in the disclosed techniques may be designed in such a way that they may be capable of handling and deploying a private mobile network on small form factors (e.g., 1RU/3RU servers).
5. Resiliency Support: As reliability is a key focus for 3GPP deployments, the system implementing the disclosed techniques may provide support for High Availability (HA) for network functions.
6. Load Balancing: The systems implementing the disclosed techniques may provide automatic load balancing, in some instances.

Figure 1:
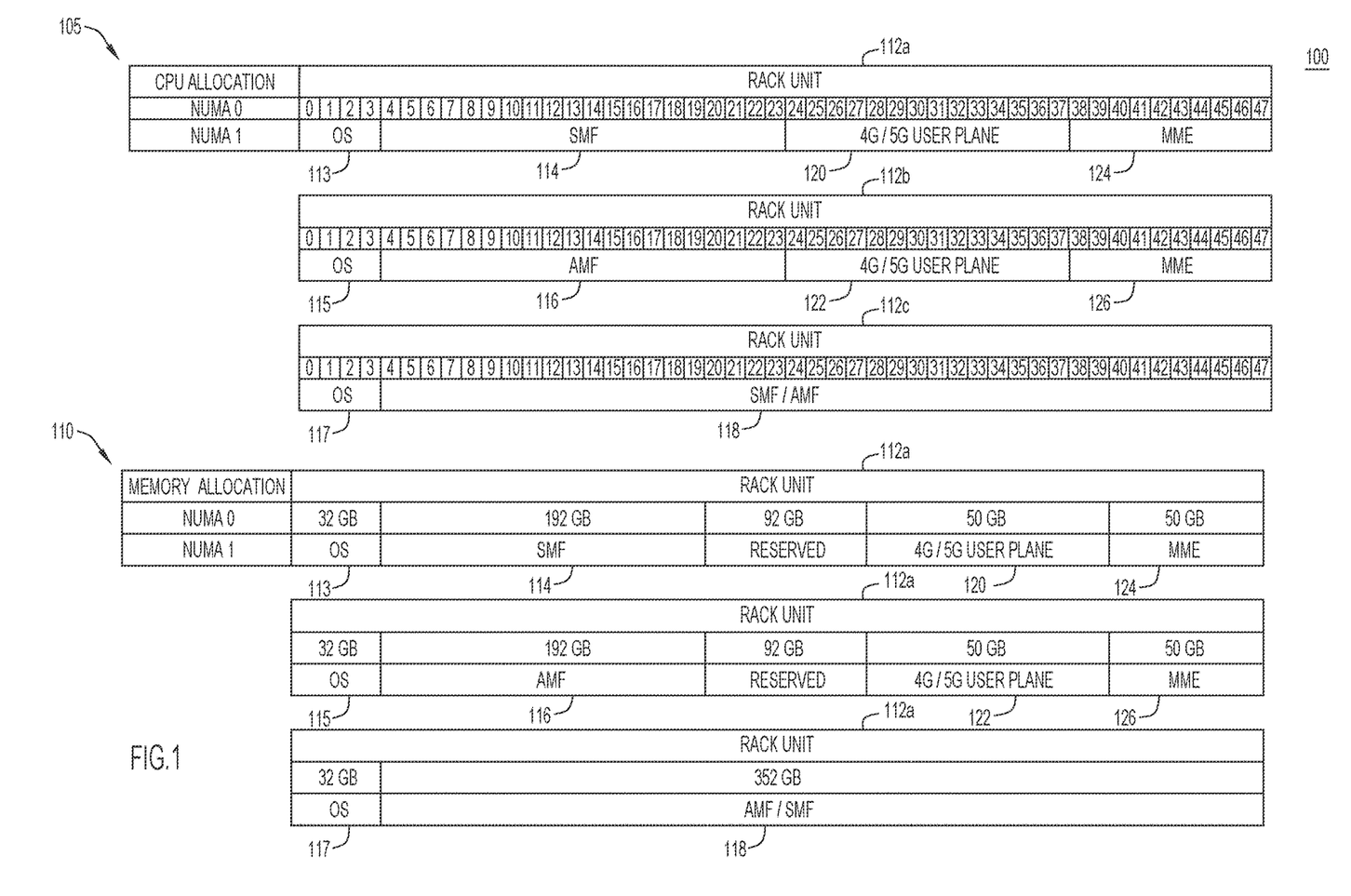
FIG. 1 is a first mobile network deployment server configuration generated based on the edge cloud core deployment techniques disclosed herein, according to an example embodiment.

With reference now made to FIG. 1, depicted therein is a first example server configuration 100 generated according to the techniques of the present disclosure. Specifically, server configuration 100 is configured to implement a hybrid 4G/5G mobile network core using a 3RU form factor, and includes a central processing unit (CPU) allocation 105 and a memory allocation 110. Server configuration 100 implements an eMBB mobile network core that provides high availability for 20,000 subscribers. Though, the disclosed techniques are not limited to eMBB use cases. Other embodiments may implement URLLC network services and/or massive Machine Type Communications (mMTC) network services.

According to the techniques disclosed herein, a user may indicate criteria for an eMBB network with 20,000 subscribers that prioritizes throughput and availability over low latency. Based upon these criteria, the techniques disclosed herein may generate a server configuration, such as server configuration 100 illustrated in FIG. 1. As described in detail below, server configuration 100 implements high availability by implementing the control plane over all three rack units 112a-c such that if any one rack unit fails, the control plane will continue to be available. Similarly, the user plane is implemented through two of the rack units, rack units 112a and 112b. Therefore, if one of the rack units fails, the user plane will continue to be available. Accordingly, the eMBB network provided by server configuration 100 will only cease to be available if two or more of the rack units 112a-c fail.

As illustrated in CPU allocation 105, each of rack units 112a-c includes 48 processor cores, numbered 0 through 47. As illustrated in memory allocation 110, each of rack units 112*a*-c has 384 GB of memory. The first rack unit 112*a* implements portions of the eMBB control plane, such as, functionality for a Session Management Function (SMF) 114 of a 5G control plane, a hybrid 4G/5G user plane 120, and a 4G control plane or Mobility Management Entity (MME) 124. Specifically, first rack unit 112*a* allocates processor cores 0 through 3 to operating system functions 113, such as a host operating system and a container operating system for rack unit 112*a*, and 32 GB of memory to these elements. Processor cores 4-23 and 160 GB of memory are allocated to portions of the 5G eMBB control plane functions, specifically the SMF 114. Processor cores 24-37 and 50 GB of memory are allocated to the hybrid 4G/5G user plane 120. For example, hybrid user plane 120 may provide network functionality of a User Plane Function (UPF) of a 5G user plane and a user plane Packet Data Network (PDN) Gateway (PGW-U) and a user plane Serving Gateway (SGW-U) of the 4G data plane. Finally, processor cores 38-47 and 50 GB of memory are allocated to the 4G control plane, specifically MME 124.

Second rack unit 112*b* implements other aspects of the eMBB 5G control plane, as well as a second instance of the hybrid 4G/5G user plane and the 4G control plane. First, like first rack unit 112*a*, second rack unit 112*b* allocates processor cores 0 through 3 and 32 GB of memory to operating system functions 115 for second rack unit 112*b*. Processor cores 4-23 and 160 GB of memory of second rack unit 112*b* are allocated to a different control plane function of the eMBB 5G control plane than first rack unit 112*a*. Specifically, second rack unit 112*b* implements an Access and Mobility Management Function (AMF) 116 of the 5G control plane. Second rack unit 112*b* also implements a second instance of the hybrid 4G/5G user plane, allocating processor cores 24-37 and 50 GB of memory to hybrid 4G/5G user plane 122. Finally, processor cores 38-47 and another 50 GB of memory are allocated to MME 126, providing a second instance of the 4G control plane.

As noted above, first rack unit 112*a* and second rack unit 112*b* each provide an instance of the hybrid 4G/5G user plane and the 4G control plane. Accordingly, if one of the first rack unit 112*a* or the second rack unit 112*b* fails, the other of the two rack units will continue to provide the hybrid 4G/5G user plane and the 4G control plane, ensuring relatively high availability of these services. On the other hand, first rack unit 112*a* and second rack unit 112*b* provide different aspects of the 5G control plane, the SMF 114 and AMF 116, respectively. To ensure high availability of these services, third rack unit 112*c* implements both the SMF and the AMF through SMF/AMF allocation 118.

Specifically, third rack unit 112*c* allocates processors cores 4-47 and 352 GB of memory to SMF/AMF allocation 118. Accordingly, third rack unit 112*c* provides redundancy for the SMF 114 in the event first rack unit 112*a* fails, and vice versa. Similarly, third rack unit 112*c* provides redundancy for the AMF 116 in the event the second rack unit 112*b* fails, and vice versa. As with first rack unit 112*a* and second rack unit 112*b*, third rack unit 112*c* allocates processor cores 0-3 and 32 GB of memory to operating system functions 117 for third rack unit 112*c*.

As illustrated through server configuration 100, the techniques disclosed herein may provide configuration details down to the level of memory and processor core allocations for specific functions of the edge cloud deployments. Such details may not be provided by slicing techniques, which are focused on the logical separation by user group of a shared infrastructure. Accordingly, the techniques described herein provide for server configurations that are distinct from what is provided by slicing techniques. Furthermore, the benefits of the disclosed techniques, as described above, are distinct from those of slicing techniques.

Figure 2:
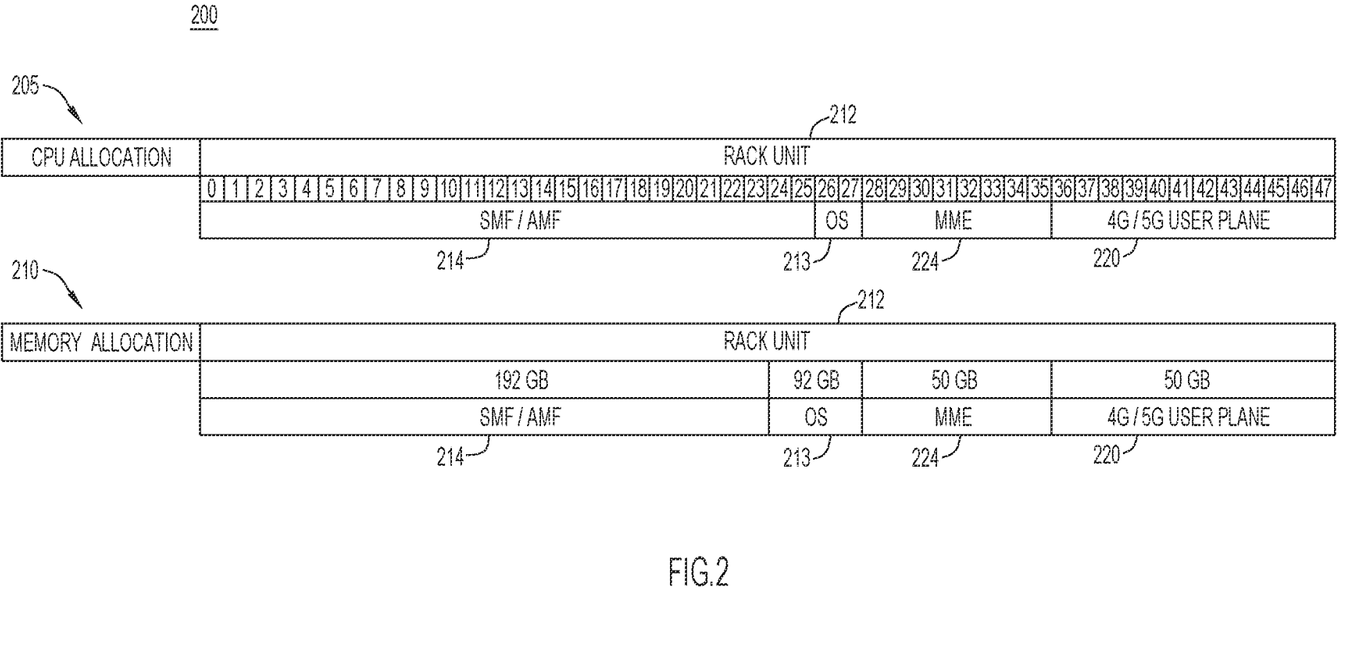
FIG. 2 is a second mobile network deployment server configuration generated based on the edge cloud core deployment techniques disclosed herein, according to an example embodiment.

Turning to FIG. 2, depicted therein is a second server configuration 200, including a second CPU allocation 205 and a second memory allocation 210. Server configuration 200 also implements a Hybrid Private Network developed using the server configuration templates of the present disclosure. Server configuration 200 is deployed on one rack unit 212 that is capable of supporting eMBB for 5,000 subscribers, where server configuration 100 of FIG. 1 implements an eMBB mobile network core across a 3RU form factor that services 20,000 subscribers with relatively high availability. Server configuration 200 sacrifices availability for low latency. Specifically, because the user plane functions and the control plane functions are all located on the same rack unit 212, signaling latency may be significantly reduced in a deployment configured as illustrated in FIG. 2. However, because only a single rack unit is used to implement the eMBB mobile network core, failure of rack unit 212 will result in failure of the entire eMBB mobile network core. Similarly, because fewer resources are available on a 1RU form factor, server configuration 200 services few subscribers than server configuration 100.

Included in server configuration 200 is the 5G control plane 214, which includes the SMF and AMF. The 5G control plane 214 is allocated 24 process cores and 192 GB of memory on rack unit 212. Also on rack unit 212 is the 4G control plane 224 (i.e., the MME), which is allocated 8 processor cores and 50 GB of memory. As with the other components, the hybrid 4G/5G user plane 220 is also co-located on rack unit 212, with 12 processor cores and 50 GB of memory allocated thereto. Finally operating system elements 213 for rack unit 212 are allocated two processor cores and 92 GB of memory.

Figure 3:
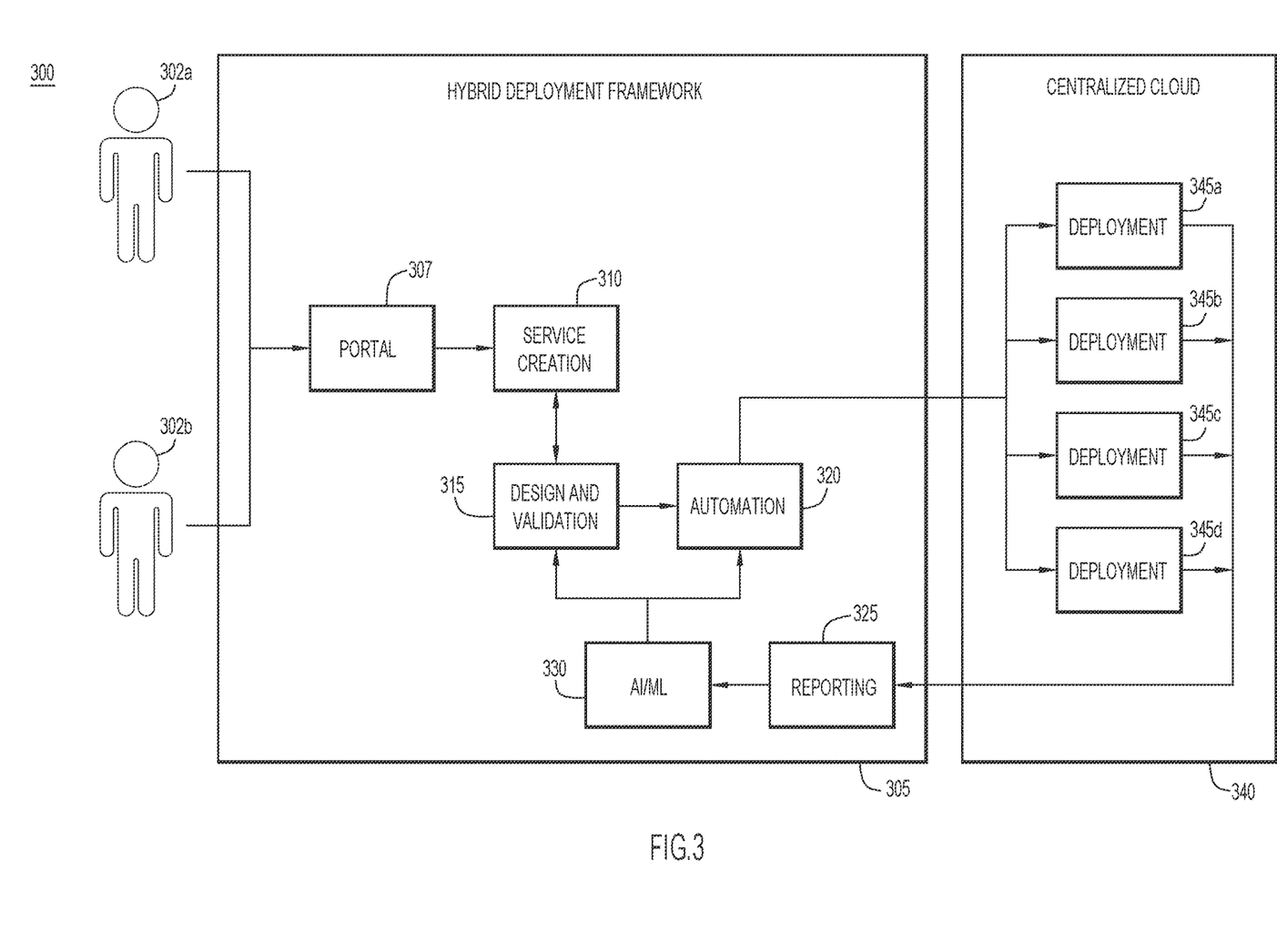
FIG. 3 is a functional block diagram of a system configured to implement the edge cloud core deployment techniques disclosed herein, according to an example embodiment.

With reference now made to FIG. 3, depicted therein is a system 300 configured to implement the techniques disclosed herein. Included in system 300 are deployment framework 305 and centralized cloud 340. Deployment framework 305 is configured with a number of services via which the mobile network deployment techniques of the present disclosure are implemented. Centralized cloud 340, on the other hand, is the cloud environment into which the mobile networks are deployed.

Included in hybrid deployment framework 305 are portal 307, via which users or network administrators 302*a* and 302*b* enter mobile network criteria, such as SLAs, numbers of subscribers, and other use case parameters, such as latency and throughput criteria, etc. For example, portal 307 may present users 302*a* and/or 302*b* with a series of use cases that have been pre-populated in portal 307. Users 302*a* and/or 302*b* may select one of these use cases and then provide additional information for the use cases, such as SLAs, numbers of subscribers, latency criteria and/or throughput criteria. Specific use cases may include deployments for use in hospitality and factory environments. Hospitality and factory deployments may be used to provide control signaling for sensors, alarms and machinery, such as factory robots. Because these use cases focus on control signaling, the criteria received via portal 307 may not dictate high throughput. Other use cases include automobile industry use cases, such as deployments that provide services to self-driving automobiles. The criteria received via portal 307 for such automotive use cases may dictate low latency.

The criteria received via portal 307 are provided to service creation service 310, which generates a server configuration template for the identified criteria. As described above with reference to FIGS. 1 and 2, the server configuration templates generated by service creation service 310 will distribute compute and memory resources across one or more rack unit (RU) server devices to implement a 4G/5G mobile network core in a small form factor implementation. According to specific example embodiments, the server configuration templates generated by service creation service 310 will designate specific Non-Uniform memory access (NUMA) computer memory elements and NUMA processor cores to the 4G/5G mobile network core control plane and user plane elements. For example, a 5G deployment server configuration template may indicate the processor cores and memory allocations for the AMF and the SMF necessary to implement the 5G control plane within a small form factor. The server configuration template may also indicate the processor core and memory allocations necessary to implement the UPF of the 5G user plane. In 4G deployments, the server configuration templates generated by service creation service 310 may indicate the processor core and memory allocations necessary to implement the MME of the 4G control plane and the processor cores and memory used to implement the 4G user plane (UP), including the PGW-U and/or the SGW-U. In hybrid deployments, the server configuration templates generated by service creation service 310 may include processor core and memory allocations for both 4G and 5G RAT network functions.

Once generated, the server configuration templates are validated via design and validation service 315. Design and validation service 315 optimizes the server configuration templates created in service creation service 310, and validates that the server configuration templates will meet the specific criteria received from the users via portal 307. In other words, design and validation service 315 ensures that the server configuration templates generated in service creation service 310 are created correctly by validating that the compute and memory resources indicated in the server configuration template are sufficient to meet the criteria received via portal 307. As also explained in detail below, design and validation service 315 may rely on artificial intelligence (AI)/machine learning (ML) service 330 to modify and update the server configuration templates provided by service creation service 310. For example, if AI/ML service 330 indicates that the server configuration templates are not resulting in deployments that meet the user criteria provided via portal 307, then design and validation service 315 will cause changes to the server configuration templates during validation of the templates, as well as cause changes to the server configuration templates as generated by service creation service 310.

In the specific example embodiment of FIG. 3, AI/ML service 330 is illustrated as a service separate from design and validation service 315. According to other embodiments, AI/ML service 330 may execute as part of another service, such as design and validation service 315.

The validated server configuration templates are then provided to automation service 320 as a server configuration for specific network resources within centralized cloud 340. Automation service 320 is responsible for deploying the server configurations into centralized cloud 340 as deployments 345a-c. The deployment of the server configurations to centralized cloud 340 may include predictive analysis that provides the SLA for each server configuration based on historical data at the time of deployment. As will be explained in detail below, automation service 320 may also implement the results of AI/ML service 330. Specifically, automation service 320 may use the output of AI/ML service 330 to take proactive action and make predictions of network health to ensure that the SLAs for the server configurations are met. For example, if AI/ML service 330 indicates a likely failure of a deployment to meet the SLA, automation service 320 may take proactive action to avoid the failure by changing parameters of the server configuration so that disruptions in the service are avoided.

Reporting service 325 receives operational data from deployments 345a-d. For example, reporting service 325 receives KPIs, such as compute and memory utilization data, from deployments 345a-d. This data is provided to AI/ML service 330 to provide for improved server configuration templates, improved server configurations, and improved validation of the server configuration templates and server configurations.

Finally, AI/ML service 330 provides artificial intelligence and machine learning algorithms that are applied to the historical data received via reporting service 325. Based on this received historical data, AI/ML service 330 can predict when one of deployments 345a-d may fail to meet the criteria provided by users 302a and 302b. For example, certain levels of CPU usage, memory usage, latency values, and/or throughput levels may indicate to AI/ML service 330 that one of deployments 345a-d will fail to meet its associated criteria. Additionally, AI/ML service 330 may be trained to determine necessary compute and memory resources to ensure that the associated criteria are met. Accordingly, AI/ML service 330 provides indications to both automation service 320 and design and validation service 315 of the updated compute and memory resources necessary to meet the indicated criteria for the use cases associated with deployments 345a-d. In response, automation service 320 will update the server configurations associated with deployments 345a-d with the updated compute and memory resources. Design and validation service 315 will similarly update the server configuration templates generated by service creation service 310 to ensure that subsequently generated server configuration templates meet the criteria provided by users 302a and 302b. Similarly, when design and validation service 315 validates server configuration templates generated by service creation service 310, the validation will implement the indications provided by AI/ML service 330 to ensure that the generated server configuration templates meet the criteria.

Figure 4:
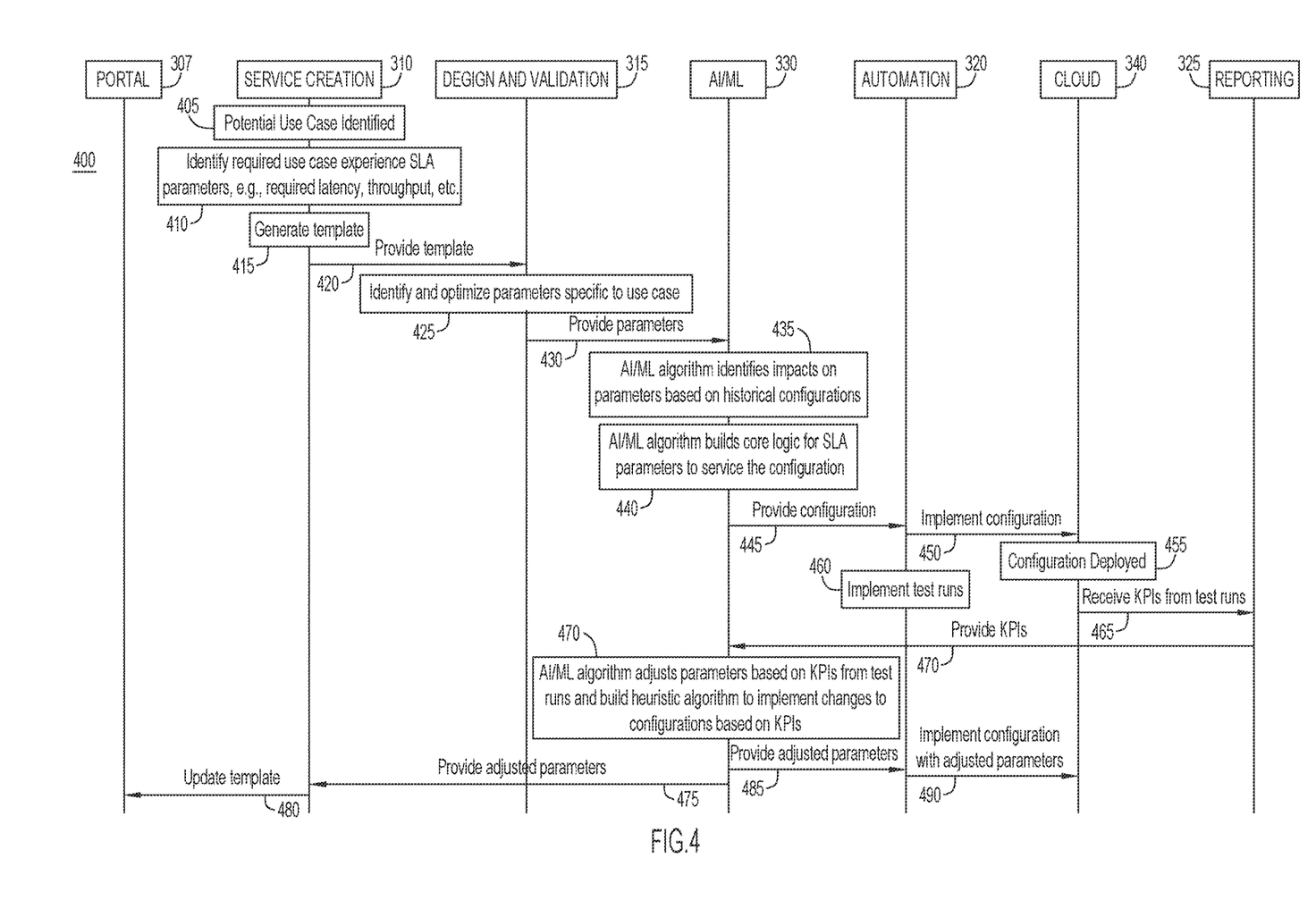
FIG. 4 is a first call flow diagram implementing the edge cloud core deployment techniques disclosed herein, according to an example embodiment.

Turning now to FIG. 4, depicted therein is a call flow 400 illustrating a call flow for implementing the techniques disclosed herein. Call flow 400 indicates a process via which a master server configuration template is created and updated using AI/ML algorithms to ensure that the server configuration template can appropriately meet the criteria of the use case for which it was created. Call flow 400 includes call flows between the services described above with reference to FIG. 3, specifically, portal 307, service creation service 310, design and validation service 315, automation service 320, reporting service 325, AI/ML service 330 and cloud 340.

Call flow 400 begins with operation 405 in which a potential use case is identified and provided to service creation service 310. Next, in operation 410, SLA parameters are identified for the use case identified in operation 405. Unlike many of the other operations, operations 405 and 410 may be performed manually by, for example, an engineer with knowledge regarding specific user use cases and/or the criteria needed to fulfill such a use case. Based on these identified criteria, a server configuration template is generated in operation 415.

In operation 420, the newly generated server configuration template is provided to design and validation service 315, which identifies and optimizes parameters specific to the use case in operation 425. For example, design and validation service 315 may determine an initial number of RUs to associate with the newly generated server configuration template, as well as initial memory and compute allocations for the different mobile core network elements to be implemented to meet the criteria of the use case.

In operation 430, the parameters identified in operation 425 are provided to AI/ML service 330, which identifies changes to be made to the parameters based upon historic server configurations in operation 435. In operation 440, the AI/ML algorithm builds core logic for a server configuration to be implemented as a deployment within cloud 340 to service the SLAs associated with the use case.

In operation 445, the server configuration determined in operation 440 is provided to automation service 320. Automation service 320 implements the server configuration as a deployment within cloud 340 via operation 450. A deployment may be implemented within cloud 340 by assigning specific CPU cores and memory allocations to the functional units necessary to implement the deployment. In other words, operation 450 may include the assignment of compute and memory resources of one or more RUs to the functional elements of the deployment, examples of which are illustrated in FIGS. 1 and 2. Once deployed in operation 455, automation service 320 performs test runs on the deployed server configuration via operation 460 to test if the server configuration meets the SLAs associated with the deployment.

KPIs from the test runs are received by reporting service 325 in operation 465, which reports the KPIs to AI/ML service 330 in operation 470. Based upon the received KPIs, AI/ML service 330 adjust the parameters for the use case in operation 470. Operation 470 may also include building or updating a heuristic algorithm to implement future changes to server configuration template parameters based on the received KPIs. The changes to the parameters determined in operation 470 may be retested by, for example, repeating operations 445-470 on the parameter changes.

Next, in operation 475, updates to the server configuration template are provided to service creation service 310 in operation 480, which makes the server configuration templates available on the portal 307 for users to select.

In addition to updating the server configuration templates, AI/ML service 330 may also provide adjusted parameters for the server configuration deployed in cloud 340 based upon the KPIs received from reporting service 325. Accordingly, in operation 485, AI/ML service 330 provides the adjusted parameters to automation service 320. Automation service 320 then implements the server configuration of the deployment within cloud 340 using the updated parameters, as illustrated through operation 490.

Figure 5:
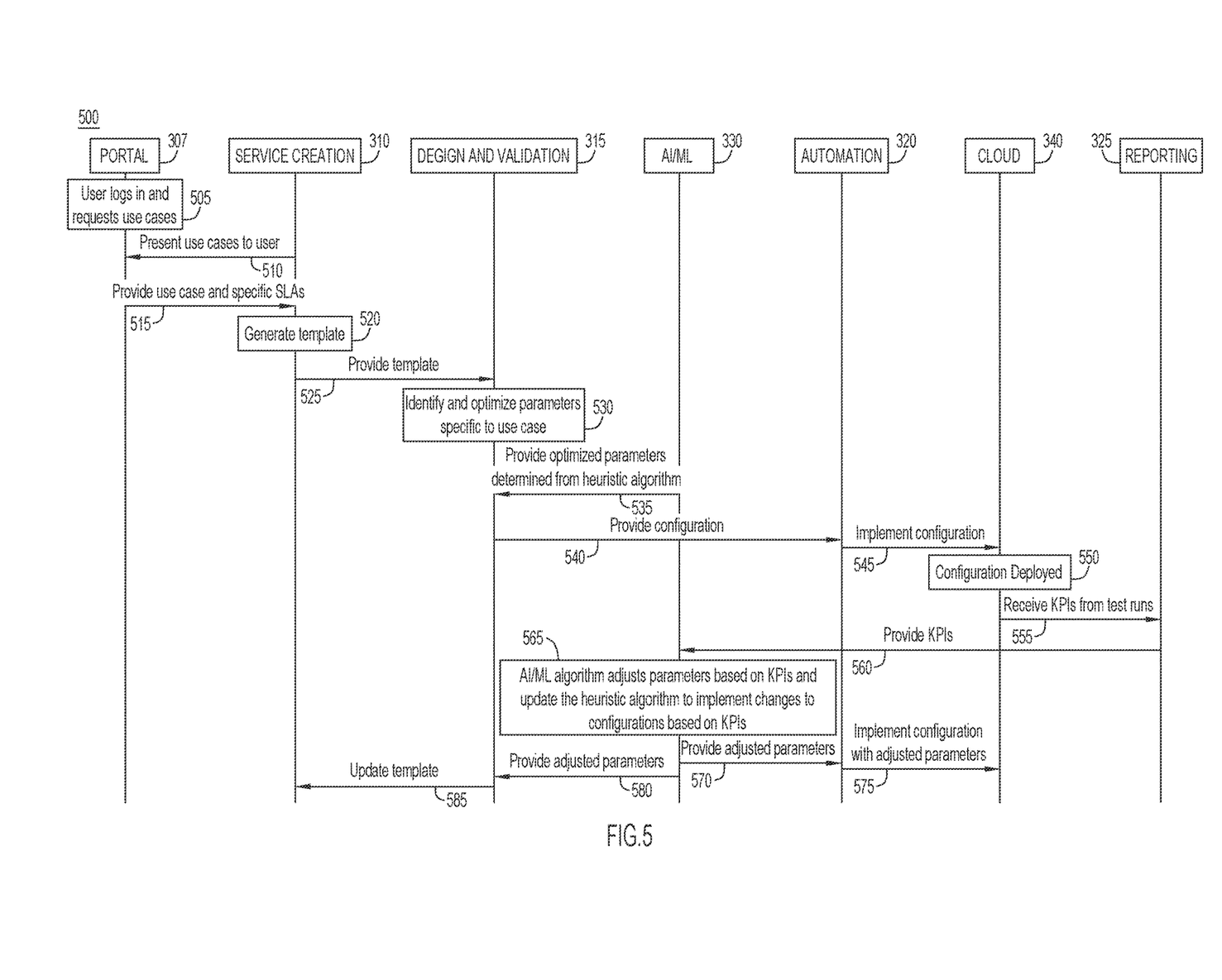
FIG. 5 is a second call flow diagram implementing the edge cloud core deployment techniques disclosed herein, according to an example embodiment.

Once available to users, the server configuration templates generated according to call flow 400 of FIG. 4 may be used for user deployments, and further updated by AI/ML service 330, as illustrated in detail with reference to call flow 500 of FIG. 5.

Call flow 500 begins in operation 505 in which a user logs into portal 307 and requests use cases for a potential deployment within cloud 340. In operation 510, service creation service 310 presents use cases to the user via portal 307, and in operation 515, the user selects a use case and provides specific criteria (SLAs, etc.) for the user's intended deployment. In operation 520, service creation service 310 generates a server configuration template to implement the use case identified by the user in operation 515. Once the server configuration template is generated, it is provided to design and validation service 315 in operation 525. Design and validation service 315 identifies optimized parameters in operation 530. Furthermore, AI/ML service 330 may further update the parameters of the server configuration template based on heuristic algorithms determined from historical deployments within cloud 340, as illustrated in operation 535.

In operation 540, a server configuration derived from the server configuration template is provided to automation service 320. Automation service 320 then implements the server configuration via operation 545 as a deployment within cloud 340, resulting in the server configuration being deployed within cloud 340 in operation 550. The implementation of the server configuration within cloud 340 may include test runs implemented by automation service 320, similar to operation 460 of call flow 400 of FIG. 4. Once deployed, KPIs are received by reporting service 325 in operation 555. These KPIs may be from test runs implemented by automation service 320 or the KPIs associated with live production traffic serviced by the deployment within cloud 340.

Reporting service 325 provides the KPIs to AI/ML service 330 via operation 560. In operation 565, AI/ML service 330 determines adjusted parameters for the server configuration based upon the KPIs received from reporting service 325. AI/ML service 330 may also update its heuristic algorithm based upon the KPIs.

In operation 570, AI/ML service 330 provides the adjusted parameters to automation service 320. Automation service 320 then implements the server configuration of the deployment within cloud 340 using the updated parameters, as illustrated through operation 575. AI/ML service 330 also provides the updated parameters to design and validation service 315 via operation 580. Based upon the updated parameters, design and validation service 315 updates the parameters associated with the server configuration template in operation 585.

Figure 6:
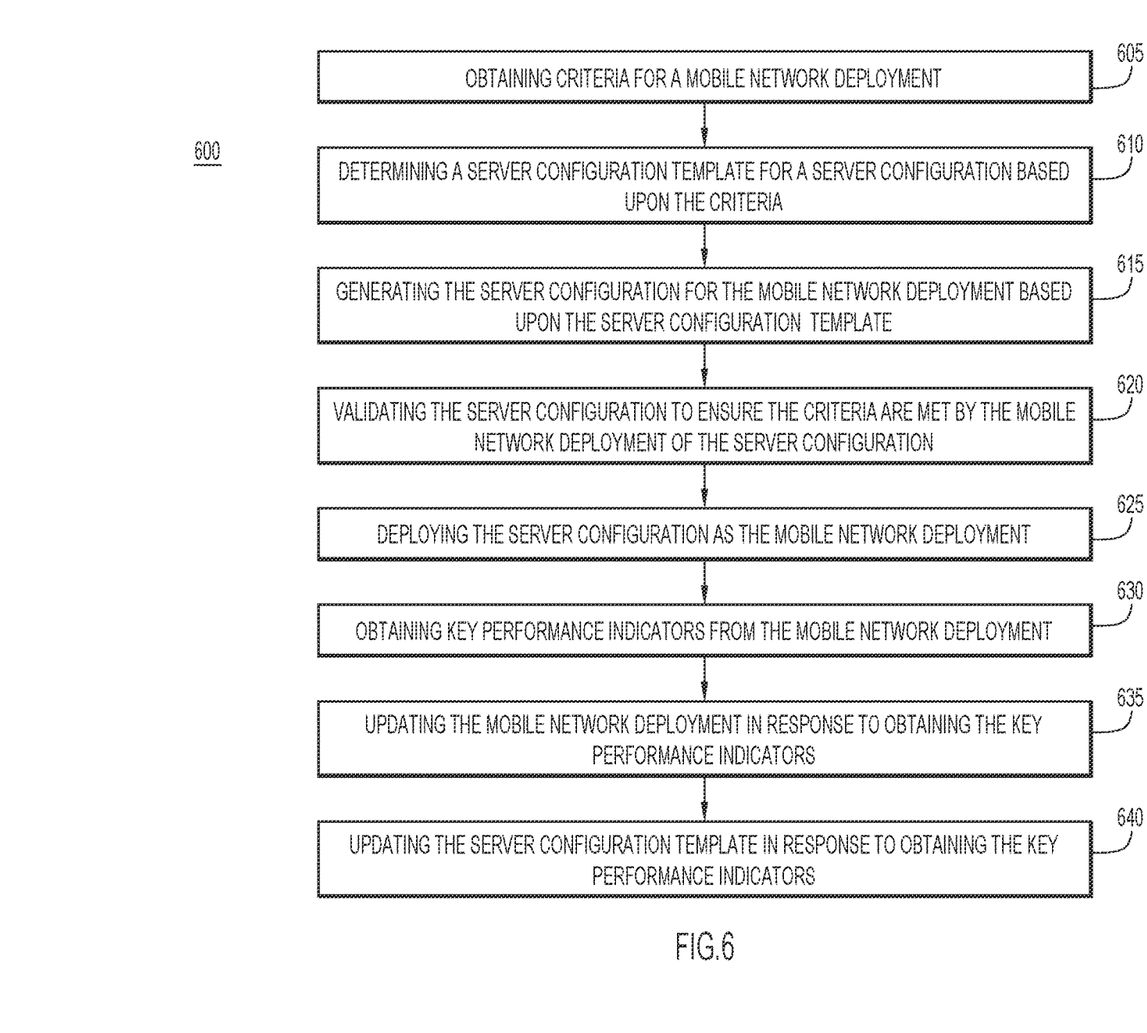
FIG. 6 is a flowchart illustrating a generalized process flow for implementing the edge cloud core deployment techniques disclosed herein, according to an example embodiment.

With reference now made to FIG. 6, depicted therein is a flowchart 600 illustrating a generalized process flow for implementing the techniques of the present disclosure. As discussed in detail below, the process flow of flowchart 600 may encompass one or both of the processes illustrated in call flows 400 and 500 of FIGS. 4 and 5, respectively.

Flowchart 600 beings in operation 605 where criteria for a mobile network deployment are obtained. Accordingly, operation 605 may be embodied as one or more of operations 405 and 410 of FIG. 4 or operations 505-515 of FIG. 5.

In operation 610 a server configuration template is determined for a server configuration based upon the criteria. For example, operation 610 may be embodied as one or more of operations 415 of FIG. 4 or operation 520 of FIG. 5.

In operation 615 a server configuration is generated for the deployment based upon the determined server configuration template. Accordingly, operation 615 may be embodied as one or more of operations 425 and 430 of FIG. 4 or operations 530-540 of FIG. 5.

In operation 620 the server configuration is validated to ensure that the criteria obtained in operation 605 are met by the deployment of the server configuration. For example, operation 620 may be embodied as one or more of operations 435 and 440 of FIG. 4 or operation 535 of FIG. 5.

In operation 625 the server configuration is deployed as the mobile network deployment. Therefore, operation 625 may be embodied as one or more of operations 445-455 of FIG. 4 or operations 540-550 of FIG. 5.

In operation 630 KPIs are obtained from the mobile network deployment. The KPIs of operation 630 may be obtained from test runs performed to ensure that the criteria obtained in operation 605 are being met. The KPIs may also be obtained in response to live production traffic being serviced by the deployment. Accordingly, operation 630 may be embodied as one or more of operations 460-470 of FIG. 4 or operations 555 and 560 of FIG. 5.

In operation 635 the mobile network deployment is updated in response to obtaining the KPIs. For example, as explained with reference to FIGS. 4 and 5, AI/ML service 330 utilizes heuristic algorithms that receive the KPIs from the mobile network deployment. As noted above, these KPIs may be from test runs and/or the servicing of production traffic by the deployment. Based on the obtained KPIs, AI/ML service 330 may update the deployment to ensure that the criteria obtained in operation 605 are met. Accordingly, operation 635 may be embodied as one or more of operations 470, 485 and 490 of FIG. 4 or operations 565-575 of FIG. 5.

Finally, in operation 640 the server configuration template determined in operation 610 is updated in response to the KPIs obtained in operation 630. Similar to operation 635, AI/ML service 330 of FIGS. 4 and 5 may utilizes heuristic algorithms that receive the KPIs from the mobile network deployment. As noted above, these KPIs may be from test runs and/or the servicing of production traffic by the deployment. Based on the obtained KPIs, AI/ML service 330 may update the server configuration template to ensure that the criteria obtained in operation 605 are met by the deployments based upon the server configuration template. Accordingly, operation 640 may be embodied as one or more of operations 475 and 480 of FIG. 4 or operations 580 and 585 of FIG. 5.

Figure 7:
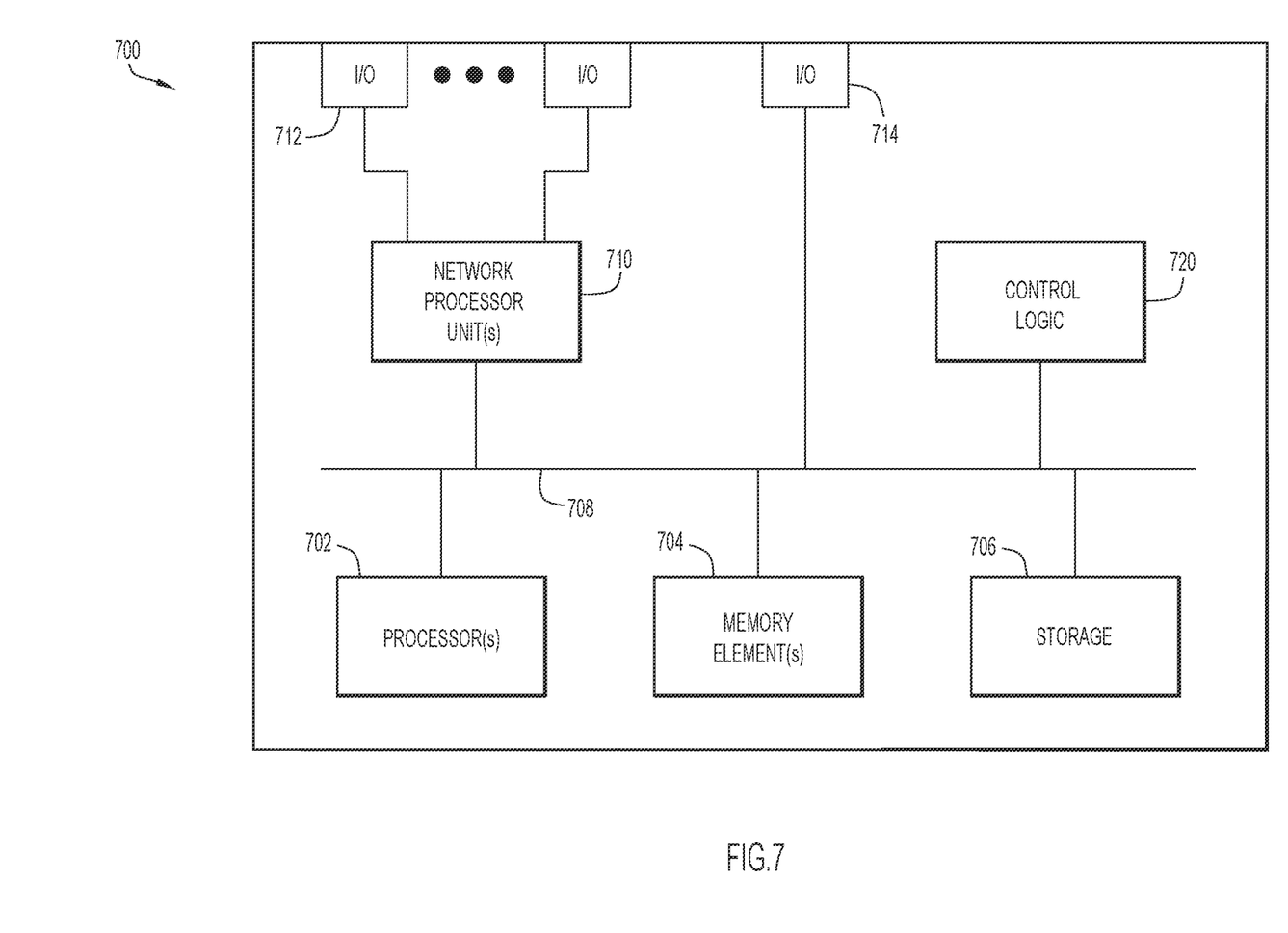
FIG. 7 is a functional block diagram of a device configured to implement the edge cloud core deployment techniques of the present disclosure, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi/Wi-Fi6), IEEE 802.16 (e.g., Worldwide Interoperability for Microwave Access (WiMAX)), Radio-Frequency Identification (RFID), NFC, Bluetooth™, mm.wave, UWB, etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

[ow] Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, the techniques described herein relate to a method including: obtaining criteria for a mobile network deployment; selecting a server configuration template for a server configuration based upon the criteria; generating the server configuration for the mobile network deployment based upon the server configuration template; validating the server configuration to ensure the criteria are met by the mobile network deployment of the server configuration; deploying the server configuration as the mobile network deployment; obtaining key performance indicators from the mobile network deployment; updating the mobile network deployment in response to obtaining the key performance indicators; and updating the server configuration template in response to obtaining the key performance indicators.

In some aspects, the techniques described herein relate to a method, wherein the mobile network deployment includes a Third Generation Partnership Project deployment.

In some aspects, the techniques described herein relate to a method, wherein the criteria include one or more of a number of subscribers, a service level agreement (SLA) or a Third Generation Partnership Project network type.

In some aspects, the techniques described herein relate to a method, wherein the Third Generation Partnership Project network type includes one or more of an enhanced Mobile Broadband network (eMBB) service, an Ultra Reliable Low Latency Communications network (URLTC) service, or a massive Machine Type Communications Network (mMTC) service.

In some aspects, the techniques described herein relate to a method, wherein the server configuration includes one or more of a server compute resource or a memory resource for the mobile network deployment to meet the criteria.

In some aspects, the techniques described herein relate to a method, wherein the key performance indicators include one or more of CPU usage data or memory usage data.

In some aspects, the techniques described herein relate to a method, wherein updating the server configuration template includes utilizing a heuristic artificial intelligence algorithm to adjust the server configuration template based upon the key performance indicators.

In some aspects, the techniques described herein relate to a method, wherein updating the mobile network deployment includes utilizing a heuristic artificial intelligence algorithm to adjust the mobile network deployment based upon the key performance indicators.

In some aspects, the techniques described herein relate to a method, wherein the mobile network deployment includes a hybrid Third Generation Partnership Project deployment.

In some aspects, the techniques described herein relate to an apparatus including: one or more network interfaces; and one or more processors configured to: obtain, via the one or more network interfaces, criteria for a mobile network deployment; select a server configuration template for a server configuration based upon the criteria; generate the server configuration for the mobile network deployment based upon the server configuration template; validate the server configuration to ensure the criteria are met by the mobile network deployment of the server configuration; deploy the server configuration as the mobile network deployment; obtain, via the one or more network interfaces, key performance indicators from the mobile network deployment; update the mobile network deployment in response to obtaining the key performance indicators; and update the server configuration template in response to obtaining the key performance indicators.

In some aspects, the techniques described herein relate to an apparatus, wherein the mobile network deployment includes a Third Generation Partnership Project deployment.

In some aspects, the techniques described herein relate to an apparatus, wherein the server configuration includes one or more of a server compute resource or a memory resource for the mobile network deployment to meet the criteria.

In some aspects, the techniques described herein relate to an apparatus, wherein the key performance indicators include one or more of CPU usage data or memory usage data.

In some aspects, the techniques described herein relate to an apparatus, wherein the one or more processors are configured to update the server configuration template by utilizing a heuristic artificial intelligence algorithm to adjust the server configuration template based upon the key performance indicators.

In some aspects, the techniques described herein relate to an apparatus, wherein the one or more processors are configured to update the mobile network deployment by utilizing a heuristic artificial intelligence algorithm to adjust the mobile network deployment based upon the key performance indicators.

In some aspects, the techniques described herein relate to one or more tangible, non-transitory computer readable mediums encoded with instructions, wherein the instructions, when executed by one or more processors, are operable to: obtain criteria for a mobile network deployment; select a server configuration template for a server configuration based upon the criteria; generate the server configuration for the mobile network deployment based upon the server configuration template; validate the server configuration to ensure the criteria are met by the mobile network deployment of the server configuration; deploy the server configuration as the mobile network deployment; obtain key performance indicators from the mobile network deployment; update the mobile network deployment in response to obtaining the key performance indicators; and update the server configuration template in response to obtaining the key performance indicators.

In some aspects, the techniques described herein relate to one or more tangible, non-transitory computer readable mediums, wherein the mobile network deployment includes a Third Generation Partnership Project deployment.

In some aspects, the techniques described herein relate to one or more tangible, non-transitory computer readable mediums, wherein the server configuration includes one or more of a server compute resource or a memory resource for the mobile network deployment to meet the criteria.

In some aspects, the techniques described herein relate to one or more tangible, non-transitory computer readable mediums, wherein the key performance indicators include one or more of CPU usage data or memory usage data.

In some aspects, the techniques described herein relate to one or more tangible, non-transitory computer readable mediums, wherein the instructions operable to update the server configuration template are further operable to utilize a heuristic artificial intelligence algorithm to adjust the server configuration template based upon the key performance indicators.

Accordingly, the techniques disclosed herein may be leveraged to deploy all the network functions of 4G and 5G RATs over the small form factor servers to achieve improved manageability and performance. Specifically templates are used to determine the compute and memory resources needed to deploy a 4G/5G core to run a particular use case. Accordingly, engineers may not need to work and calculate on compute and do again and again optimization reducing the operation cost.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining criteria for a mobile network deployment;
selecting a server configuration template for a server configuration based upon the criteria;
generating the server configuration for the mobile network deployment based upon the server configuration template;
validating the server configuration to ensure the criteria are met by the mobile network deployment of the server configuration;
deploying the server configuration as the mobile network deployment;
obtaining key performance indicators from the mobile network deployment;
updating the mobile network deployment in response to obtaining the key performance indicators; and
updating the server configuration template in response to obtaining the key performance indicators.

2. The method of claim 1, wherein the mobile network deployment comprises a Third Generation Partnership Project deployment.

3. The method of claim 1, wherein the criteria comprise one or more of a number of subscribers, a service level agreement (SLA) or a Third Generation Partnership Project network type.

4. The method of claim 3, wherein the Third Generation Partnership Project network type comprises one or more of an enhanced Mobile Broadband network (eMBB) service, an Ultra Reliable Low Latency Communications network (URLTC) service, or a massive Machine Type Communications Network (mMTC) service.

5. The method of claim 1, wherein the server configuration includes one or more of a server compute resource or a memory resource for the mobile network deployment to meet the criteria.

6. The method of claim 1, wherein the key performance indicators comprise one or more of CPU usage data or memory usage data.

7. The method of claim 1, wherein updating the server configuration template comprises utilizing a heuristic artificial intelligence algorithm to adjust the server configuration template based upon the key performance indicators.

8. The method of claim 1, wherein updating the mobile network deployment comprises utilizing a heuristic artificial intelligence algorithm to adjust the mobile network deployment based upon the key performance indicators.

9. The method of claim 1, wherein the mobile network deployment comprises a hybrid Third Generation Partnership Project deployment.

10. An apparatus comprising:
one or more network interfaces; and
one or more processors configured to:

obtain, via the one or more network interfaces, criteria for a mobile network deployment;

select a server configuration template for a server configuration based upon the criteria;

generate the server configuration for the mobile network deployment based upon the server configuration template;

validate the server configuration to ensure the criteria are met by the mobile network deployment of the server configuration;

deploy the server configuration as the mobile network deployment;

obtain, via the one or more network interfaces, key performance indicators from the mobile network deployment;

update the mobile network deployment in response to obtaining the key performance indicators; and update the server configuration template in response to obtaining the key performance indicators.

11. The apparatus of claim 10, wherein the mobile network deployment comprises a Third Generation Partnership Project deployment.

12. The apparatus of claim 10, wherein the server configuration includes one or more of a server compute resource or a memory resource for the mobile network deployment to meet the criteria.

13. The apparatus of claim 10, wherein the key performance indicators comprise one or more of CPU usage data or memory usage data.

14. The apparatus of claim 10, wherein the one or more processors are configured to update the server configuration template by utilizing a heuristic artificial intelligence algorithm to adjust the server configuration template based upon the key performance indicators.

15. The apparatus of claim 10, wherein the one or more processors are configured to update the mobile network deployment by utilizing a heuristic artificial intelligence algorithm to adjust the mobile network deployment based upon the key performance indicators.

16. One or more tangible, non-transitory computer readable mediums encoded with instructions, wherein the instructions, when executed by one or more processors, are operable to:

obtain criteria for a mobile network deployment;

select a server configuration template for a server configuration based upon the criteria;

generate the server configuration for the mobile network deployment based upon the server configuration template;

validate the server configuration to ensure the criteria are met by the mobile network deployment of the server configuration;

deploy the server configuration as the mobile network deployment;

obtain key performance indicators from the mobile network deployment;

update the mobile network deployment in response to obtaining the key performance indicators; and update the server configuration template in response to obtaining the key performance indicators.

17. The one or more tangible, non-transitory computer readable mediums of claim 16, wherein the mobile network deployment comprises a Third Generation Partnership Project deployment.

18. The one or more tangible, non-transitory computer readable mediums of claim 16, wherein the server configuration includes one or more of a server compute resource or a memory resource for the mobile network deployment to meet the criteria.

19. The one or more tangible, non-transitory computer readable mediums of claim 16, wherein the key performance indicators comprise one or more of CPU usage data or memory usage data.

20. The one or more tangible, non-transitory computer readable mediums of claim 16, wherein the instructions operable to update the server configuration template are further operable to utilize a heuristic artificial intelligence algorithm to adjust the server configuration template based upon the key performance indicators.

* * * * *